Patented Oct. 4, 1938

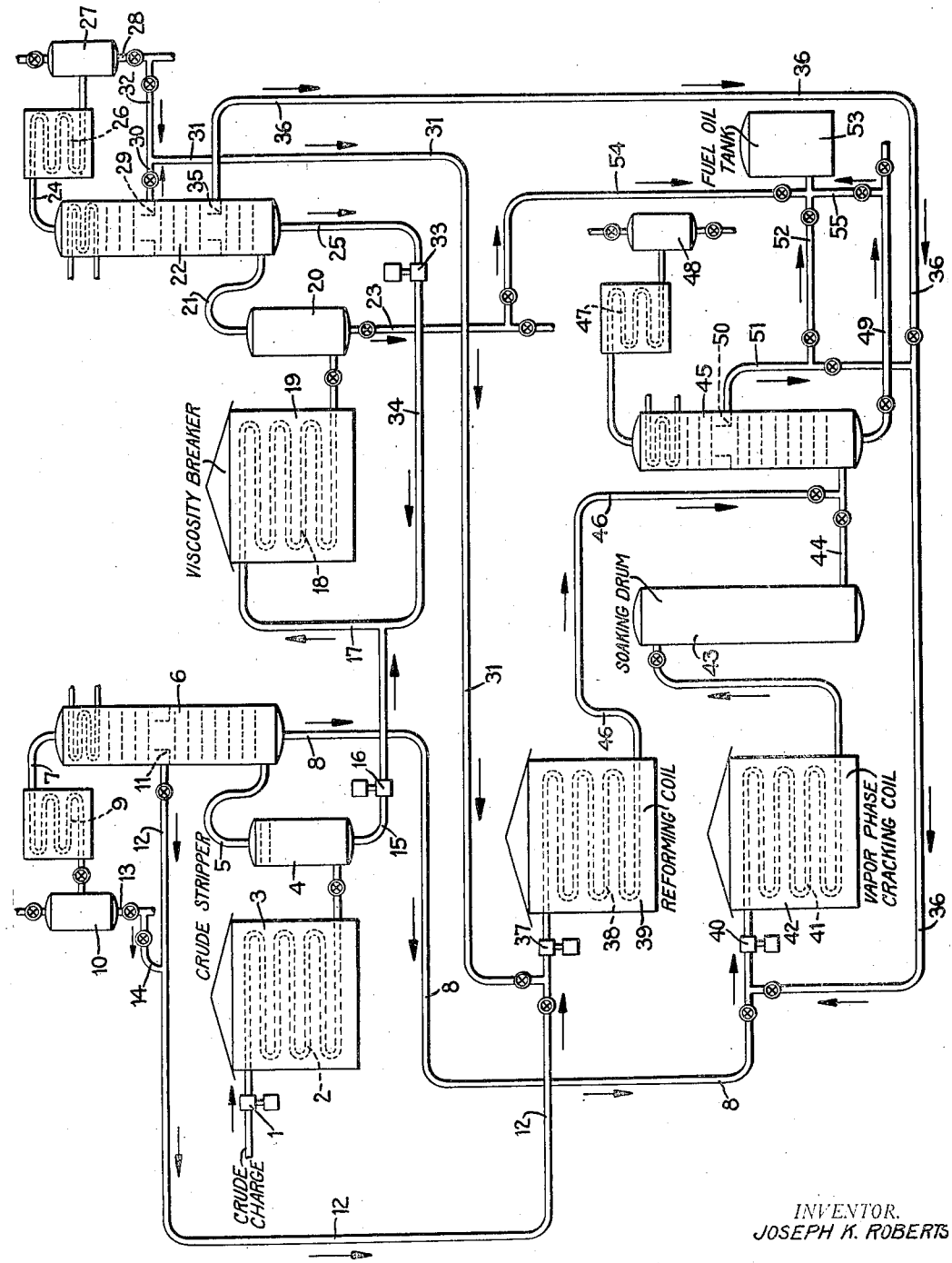

2,132,129

UNITED STATES PATENT OFFICE 2,132,129

TREATMENT OF HYDROCARBON OILS

Joseph K. Roberts, Hammond, Ind., assignor to Standard Oil Company, Chicago, Ill., a corporation of Indiana Application December 5, 1934, Serial No. 756,015

3 Claims. (Cl. 196—49)

This invention relates to the manufacture of gasoline of high anti-detonating value, and contemplates a process in which a heavy stock, such as reduced crude petroleum, is subjected to a viscosity breaking operation and in which the gasoline produced in the viscosity breaking operation is segregated and subjected to a reforming operation to transform the hydrocarbon constituents of the gasoline into constituents of increased anti-knock value.

An important object of the invention is to provide for the processing of crude petroleum to produce therefrom a maximum yield of gasoline of a maximum anti-knock value, as well as other valuable products. In accordance with this object of the invention a charging stock, such as crude petroleum, may be subjected to a stripping operation to remove from the oil gasoline contained therein, and to separate out a higher boiling condensate adapted for a cracking operation for conversion into gasoline and a residual fraction which is subjected to a viscosity breaking operation. Gasoline produced in the viscosity breaking operation is separated out from the other resultant products and this gasoline, together with gasoline separated out in the crude stripping operation, if desired, is subjected to a temperature adequate to effect a reformation of the gasoline into a gasoline of increased anti-knock quality. The higher boiling condensate, that is, the condensate which is separated out in the crude stripping operation which it is desired to treat for conversion into gasoline, may be directed to a cracking zone wherein it is subjected to cracking to effect a conversion into lower boiling or gasoline constituents. The resultant products of this cracking, as well as the products of the reforming operation, may be subjected to fractionation, as by being passed into a common fractionating zone to separate out a desired gasoline distillate as well as a higher boiling condensate which may advantageously be cycled to the cracking zone for further conversion.

The invention is particularly adapted for the treatment of crude petroleums containing large proportions of paraffinic or waxy constituents, and contemplates that the reduced crude which is subjected to the viscosity breaking operation may contain a considerable proportion of gas oil constituents (such reduced crude may, for example, be of the nature of what is known in the industry as a "long residuum") and that in the viscosity breaking operation higher boiling wax-containing fractions may be cycled to the viscosity-breaking zone in order to insure the breaking down of the waxy constituents, while gasoline constituents produced in the operation are separately collected and directed to a reforming operation.

In order to fully explain the various features of the invention, reference will now be had to the accompanying drawing, which is a diagrammatic elevation or flow diagram illustrating apparatus adapted for practicing the invention.

Referring to the drawing, charging stock such as crude petroleum is drawn from a suitable source by a pump 1 and, preferably after such heat exchange with hot products of the system as may be desired, is passed to a heating coil 2, positioned in a furnace 3, wherein the oil is brought to a desired distilling temperature. The heated oil is delivered into a still or vapor separating chamber 4, wherein separation of vapors from liquid residue takes place. The vapors pass through vapor line 5 to a fractionating tower 6 wherein the vapors are fractionated to separate out a gasoline vapor fraction, removed through vapor line 7, and a higher boiling condensate fraction removed through line 8. The gasoline vapors are condensed in the condenser coil 9 and collected as a distillate in a receiving drum 10. If desired, a higher boiling gasoline cut may be collected at 11 and withdrawn through line 12. The receiving drum 10 may be equipped with a draw-off line 13 for removing the gasoline to storage and a line 14 may be provided interconnecting the lines 13 and 12, so that any or all of the gasoline collected in the receiving drum 10 may be directed into the line 12. The invention contemplates that the gasoline withdrawn through the line 12 may be subjected to a reforming operation as will hereinafter be more fully explained, and in practicing the invention the fractionation may be so conducted in the tower 6 that a distillate having the end point of commercial gasoline or thereabouts may be collected in the receiver 10, or, if desired, a light gasoline distillate such as, for example, having an end point of about 250° F. to 300° F. may be collected in the receiver 10, while a higher boiling distillate may be withdrawn from the trap-out tray 11. Thus the gasoline distillate to be reformed may consist either of a gasoline having a boiling point range approximating ordinary gasoline, or the distillate to be reformed may consist of a heavier cut of gasoline, such for example, as a fraction boiling from 250° F. up to 400° F. or 450° F. or thereabouts.

The residual fraction separated out in the chamber 4 is withdrawn through line 15 and directed by pump 16 through line 17 to a heating coil 18, positioned in furnace 19, in which the oil is subjected to a viscosity breaking operation. The heated products from the coil 18 are directed into a vapor separating chamber 20, from which vapors pass through line 21 to a fractionating tower 22 and from which residue is withdrawn through line 23. The vapors in the fractionating tower are subjected to fractionation to separate out a gasoline vapor fraction, removed through vapor line 24, and a higher boiling condensate removed through line 25. The gasoline vapors are condensed in a condenser coil 26 and collected as a gasoline distillate in a receiving drum 27, provided with a draw-off line 28. The invention contemplates that the gasoline collected in the receiving drum 27 shall be subjected to a reforming operation, but in the event that it is desired to subject to reforming only a heavier cut of gasoline produced in the viscosity breaking operation, as for example, a cut boiling from 250° F. up to 400° F. or 450° F. or thereabouts, such heavier or higher boiling cut may be collected by a trap-out tray 29 and withdrawn through line 30. A line 31 is provided for conducting the gasoline to the reforming zone, and a branch line 32 may extend to the line 28, so that either the gasoline cut collected in the receiver 27 or the heavier or higher boiling cut withdrawn through line 30 or both of such cuts of gasoline may be delivered to the line 31 for passage to the reforming unit. Ordinarily it is preferred to reform the entire cut of gasoline as collected in the receiver 27, and the trap-out tray 29 need not be employed.

The higher boiling condensate removed from the tower 22 through line 25 may be directed by a pump 33 through line 34 to the line 17 for passage through the heating coil 18. In this way wax-containing condensate may be continuously cycled back to the viscosity breaking coil 18 to insure the breaking down of the waxy constituents. In some cases it may be desirable to separate out in the tower 22, in addition to the gasoline product, two higher boiling cuts, the heavier of which withdrawn through line 25 is passed to the viscosity breaking coil 18, and the lighter of which may be collected in a trap-out tray 35 and conducted through a line 36 to a vapor phase cracking zone as will hereinafter be more fully explained.

The invention contemplates that the heating of the crude oil in the heating coil 2 and the distillation in the still 4, may be so regulated that the residue, withdrawn from the chamber 4 and passed to the viscosity breaking coil 18, will contain a relatively large proportion of gas oil constituents while the condensate fraction withdrawn from the tower 6 through the line 8 may have a relatively low end point (ordinarily below 650° F. or 700° F.) and be of the nature of a kerosene or light gas oil, constituting a substantially completely vaporizable stock well adapted for vapor-phase cracking. In other words, in the crude stripping operation preferably only the gasoline and light stocks of the nature of kerosene or light gas oil are separated out as overhead products from the vapor separating chamber 4, while the residue which is removed from the chamber 4 for passage to the viscosity breaking zone contains a large proportion of relatively high boiling gas oil constituents. The process thus presents an advantageous method of treating certain crudes, such as, for example, some of the East Texas crudes which have a high wax content in the gas oil boiling ranges.

The gasoline constituents to be reformed are introduced by pump 37 to a heating coil 38 positioned in a furnace 39. As is indicated in the drawing, the pump 37 is adapted to withdraw gasoline from either or both of the lines 12 and 31, so that the gasoline fraction separated out in either the crude stripping operation or in the viscosity breaking operation, or composite distillates from both of these operations may be directed to the reforming coils. The gasoline constituents may be subjected in the heating coil 38 to temperatures of upwards of 850° F. to effect a transformation of hydrocarbon constituents into constituents of increased anti-knock quality.

The condensate fraction removed from the tower 6 through line 8 may be conducted by a pump 40 to a heating coil 41, positioned in furnace 42, thence into a soaking drum 43, which advantageously constitute a vapor phase cracking zone for the conversion of higher boiling hydrocarbons into lower boiling ones. As shown in the drawing, the line 36 communicates with the line 8, so that when desired the light gas oil cut withdrawn from the tower 22 may also be subjected to the cracking operation conducted in the heating coil 41 and soaking drum 43. It is contemplated that the oil introduced to the heating coil 41 shall be a substantially completely vaporizable stock adapted for subjection to conversion conditions characterized by a high rate of cracking per pass adapted for the production of gasoline of high anti-knock quality. The vapor phase cracking operation may well be conducted in accordance with the teaching of the Snow and Sullivan Patent 1,918,991.

The products from the soaking drum 43 may be delivered through a line 44 into an evaporator or fractionating tower 45. The products from the reforming coil 38 may be passed through a transfer line 46 to the tower 45 or to the line 44 entering the tower as shown in the drawing. The combined products of the reforming and the vapor-phase cracking may thus be subjected to distillation and fractionation in the tower 45 to separate out an overhead vapor fraction which may be condensed in the condenser coil 47 and collected in a receiving drum 48, and which constitutes the composite gasoline resulting from the vapor phase cracking and from the reforming of the gasoline from the viscosity breaker, as well as from the crude stripper when so desired. The residual fraction produced in the tower 45 and withdrawn through line 49 consists of residual and tarry constituents produced in the vapor phase cracking and reforming. A condensate may be collected in a trap-out tray 50 and conducted by line 51 to the line 36, so that this condensate may be cycled to the vapor phase cracking zone.

The condensate collected at 50 will ordinarily be a highly cracked product since it may include not only condensate derived from the vapor-phase cracking operation but also polymers produced in the reforming operation. These highly cracked or polymerized products appear to exert a solvent action on pitchy or sludge materials contained in cracked residues derived from cracking operations and consequently may advantageously be admixed with cracked residue. Thus, as shown in the drawing, a line 52 may be provided by which a portion or all of the condensate collected in the trap-out tray 50 may be conducted to a fuel oil tank 53. By means of branch line 54 viscosity broken residue from chamber 20, and by means of branch line 55, cracked residue from chamber 45, may be admitted to the fuel oil tank 53, thus enabling the admixing of a portion or all of the highly polymerized product withdrawn through line 51 with either the highly cracked residue from line 49, or with the viscosity broken residue from line 54, or with mixtures of such residues. It is found that upon subsequent filtration of the residue containing the highly polymerized condensate, the weight of the filter cake is materially reduced over that resulting from cutting back the cracked residue with either a straight run condensate or a condensate obtained from ordinary liquid phase cracking.

By way of example, the invention may be described as applied to the treatment of certain East Texas crudes. Crude oils having gravities of about 38 to 40 A. P. I. are processed in the crude stripping apparatus and light naphtha cuts are collected in receiver 10 having initial boiling points approximating 70° F. and end points approximating 200° F.–300° F. Heavy naphtha cuts having initial boiling points of about 200° F. and end points of about 400° F. are collected at 11. Condensates are withdrawn from tower 6 through line 8 having initial boiling points approximating 450° F. and end points approximating 650° F. The reduced crudes having initial boiling points approximating 600° F. and containing about 40% of constituents distilling off under 700° F. are withdrawn through line 15 and directed to the viscosity breaking coil 18. The reduced crudes are subjected in the heating coil 18 to maximum temperatures of about 820° F.–880° F. under pressures of about 200# to effect a cracking per pass of about 10% (as measured by conversion into gasoline of 400° F. end point) resulting in breaking down waxy constituents contained in the reduced crudes and effecting a reduction in the viscosities and pour tests thereof. The products from the viscosity breaking coil are subjected to distillation at substantially atmospheric pressure in the still 20, the gasoline distilled off being collected in the receiver 27, while higher boiling condensate containing insufficiently converted waxy constituents is cycled to the heating coil 18 for further conversion. Residue of about 4°–6° A. P. I. gravity is removed from the still 20.

The gasoline distillates derived from the viscosity breaking operation collected in the receiver 27 are passed to the reforming coil 38, together with heavy or higher boiling virgin gasoline cuts as withdrawn from the trap-out tray 11. Light gasoline distillates are collected in receiver 10 having, in these particular runs, an octane number (Co-operative Fuel Research Method) of about 72 and consequently are not subjected to reforming, but are employed for blending with the composite gasoline produced from the vapor phase cracking and reforming operations which is collected in the receiver 48. The gasoline introduced to the heating coil 38 is subjected to temperatures of about 925° F.–1000° F. under pressures approximating 750 pounds.

Gas oil cuts characterized by being substantially completely vaporizable are withdrawn from tower 6 through line 8 and directed to the vapor phase cracking coil 41, and are subjected to vapor phase cracking in the heating coil 41 and soaking drum 43, with maximum temperatures in the heating coil of approximately 890° F.–1000° F. and with transfer line temperatures of about 880° F.–980° F., under pressures of about 200 pounds. Cracking is carried on in the vapor phase cracking coil at a rate approximating 14% cracking per pass and in the drum at a rate of about 6%, thus producing an over-all cracking per pass in the vapor phase cracking zone approximating 20% (as measured by conversion into gasoline of 400° F. end point) and resulting in the production of a high anti-knock gasoline. The products from the soaking drum enter the line 44 at temperatures of about 870° F.–905° F. and are delivered into the tower 45, together with the products of the reforming operation delivered through line 46, and the combined products are subjected to distillation and fractionation in the tower at about atmospheric pressure or under higher pressures, such as about 180–200 lbs., to separate out a composite gasoline consisting of gasoline constituents derived from the vapor phase cracking and the reformed gasoline constituents produced by the reforming of the viscosity breaker gasoline and the heavy cut of gasoline from the crude stripper.

In the practice of the invention in which gasoline derived from the viscosity breaking operation is segregated and subjected to reforming, it is possible to produce a composite gasoline product, as collected in the receiver 48, having a higher anti-knock value than can be produced when the viscosity breaker gasoline is not so segregated. Thus, for example, it is found that in an operation in which the products from the viscosity breaker coil are fractionated together with the products of the vapor phase cracking and the products from the reforming of the straight-run naphtha an ultimate gasoline product of the system having an octane number of about 67 (Co-operative Research Fuel Method) was produced, as compared with the practice of the invention in which the products of the viscosity breaking operation were kept segregated from other products of cracking and the viscosity breaker gasoline subjected to reforming, which produced an ultimate yield of gasoline, consisting of the composite gasoline distillate collected in receiver 48 and the light gasoline distillate collected in receiver 10, at least as high as the first operation and having an octane number of about 73.

In the treatment of the East Texas crudes having a high paraffin content, when the distillation of the products from the viscosity breaking coil 18 are subjected to distillation in the still 20 to distill down to a 4°–6° A. P. I. gravity tar, withdrawn through line 23, such residue will ordinarily still be of too high a viscosity and pour test for most fuel purposes and the residue may thus advantageously be combined with the cracked residue withdrawn from the tower 45 through the line 49, which is characterized by having a much lower viscosity and pour test. Furthermore, it is found that by taking the total of the residual products, as withdrawn through lines 23 and 49, and adding to these combined residues portions of the highly cracked condensate withdrawn through line 51 that fuel oils may be produced capable of meeting the ordinary market requirements as to viscosity, pour test and flash test.

If desired, in the stripping of the crude oil charge, the evolved vapors may be so fractionated as to take off additional cuts intermediate the heavy gasoline cut, as collected at 11, and the vapor phase cracking cut, as withdrawn at 8, to separate out one or more additional cuts of the nature of kerosene or furnace oil. These cuts may with advantage be blended with a portion of the condensate collected at 50. In some cases it is desirable to segregate a plurality of condensate cuts in the tower 45, using certain of these cuts for blending with intermediate cuts taken from the tower 6 to form a desired kerosene or furnace oil, and directing certain other cuts to the fuel oil tank 53 for blending with the residual stocks introduced thereto. If desired, any of the cuts of highly cracked condensate, as withdrawn through line 51, may be admitted to a stripping still to distill off any constituents of lower boiling point than desired before being blended with heavy residue in tank 53.

Obviously many modifications and variations of the invention, as hereinbefore set forth, may be made without departing from the spirit and scope thereof, and therefore, only such limitations should be imposed as are indicated in the appended claims.

I claim:

1. The process of treating hydrocarbon oils that comprises fractionating crude petroleum into a residue containing heavy gas oil constituents, a substantially completely vaporizable condensate fraction and a gasoline fraction, subjecting said substantially completely vaporizable condensate fraction to vapor phase cracking temperature to effect conversion thereof in the vapor phase, subjecting said residue in a viscosity-breaking zone to moderate cracking conditions to effect a reduction in the viscosity thereof and formation of lighter gas oil constituents and gasoline constituents, separately fractionating the resultant viscosity-broken products to separate out a fraction containing gasoline constituents, combining said fraction containing gasoline constituents with said gasoline fraction obtained from the crude petroleum and subjecting the combined constituents in a reforming zone to a temperature adequate to effect the transformation of gasoline constituents into constituents of increased anti-knock quality, delivering resultant products of the vapor phase cracking and reforming operations to a common fractionating zone, separate from the fractionating zones in which the crude petroleum and viscosity-broken products are fractionated, and subjecting the products to fractionation in the common fractionating zone to separate out as a final product a gasoline distillate of high anti-knock quality.

2. The process of treating hydrocarbon oils that comprises fractionating crude petroleum into a residue containing heavy gas oil constituents, a substantially completely vaporizable condensate fraction and a gasoline fraction, subjecting said substantially completely vaporizable condensate fraction to vapor phase cracking temperature to effect conversion thereof in the vapor phase, subjecting said residue in a viscosity-breaking zone to moderate cracking conditions to effect a reduction in the viscosity thereof and formation of lighter gas oil constituents and gasoline constituents, separately fractionating the resultant viscosity-broken products to separate out a heavy reflux condensate and a fraction containing gasoline constituents, cycling said heavy reflux condensate to said viscosity-breaking zone, combining said fraction containing gasoline constituents with said gasoline fraction obtained from the crude petroleum and subjecting the combined constituents in a reforming zone to a temperature adequate to effect the transformation of gasoline constituents into constituents of increased anti-knock quality, delivering resultant products of the vapor phase cracking and reforming operations to a common fractionating zone, separate from the fractionating zones in which the crude petroleum and viscosity-broken products are fractionated, and subjecting the products to fractionation in the common fractionating zone to separate out as a final product a gasoline distillate of high anti-knock quality.

3. The process of treating hydrocarbon oils that comprises fractionating crude petroleum into a residue containing heavy gas oil constituents, a substantially completely vaporizable condensate fraction and a gasoline fraction, passing said substantially completely vaporizable condensate fraction through a recycling cracking zone wherein it is subjected to vapor phase cracking temperature to effect conversion in the vapor phase, subjecting said residue in a viscosity-breaking zone to moderate cracking conditions to effect a reduction in the viscosity thereof and formation of lighter gas oil constituents and gasoline constituents, separately fractionating the resultant viscosity-broken products to separate out a fraction containing gasoline constituents, combining said fraction containing gasoline constituents with said gasoline fraction obtained from the crude petroleum and passing the combined constituents through a single pass reforming zone in which the gasoline constituents are subjected to a temperature adequate to effect the transformation into constituents of increased anti-knock quality, delivering resultant products of the vapor phase cracking and reforming operations to a common fractionating zone, separate from the fractionating zones in which the crude petroleum and viscosity-broken products are fractionated, subjecting the products to fractionation in the common fractionating zone to form a reflux condensate and a final gasoline distillate of high anti-knock quality and cycling said reflux condensate to said recycling cracking zone.

JOSEPH K. ROBERTS.